(12) United States Patent
Laino et al.

(10) Patent No.: US 10,559,847 B2
(45) Date of Patent: *Feb. 11, 2020

(54) SODIUM ION SOLID-STATE CONDUCTORS WITH SODIUM OXOFERRATE STRUCTURE

(71) Applicant: International Business Machines Corporation, Armonk, NY (US)

(72) Inventors: Teodoro Laino, Rueschlikon (CH); Valery Weber, Gattikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/233,414

(22) Filed: Dec. 27, 2018

(65) Prior Publication Data

US 2019/0140307 A1 May 9, 2019

Related U.S. Application Data

(63) Continuation of application No. 15/480,202, filed on Apr. 5, 2017, now Pat. No. 10,170,790.

(51) Int. Cl.
*H01M 10/00* (2006.01)
*H01M 10/054* (2010.01)
(Continued)

(52) U.S. Cl.
CPC ......... *H01M 10/054* (2013.01); *H01M 4/131* (2013.01); *H01M 4/133* (2013.01);
(Continued)

(58) Field of Classification Search
CPC .... H01M 10/058; H01M 4/621; H01M 4/366; H01M 4/0426; H01M 4/0404; H01M 10/0525; H01M 2220/30
See application file for complete search history.

(56) References Cited

U.S. PATENT DOCUMENTS

| | | | |
|---|---|---|---|
| 2003/0049541 A1* | 3/2003 | Inagaki | H01M 4/525 429/332 |
| 2010/0035155 A1* | 2/2010 | Okada | C01G 1/06 429/221 |

(Continued)

FOREIGN PATENT DOCUMENTS

CN 105609871 A 5/2016

OTHER PUBLICATIONS

Guin, et al., "Survey of the Transport Properties of Sodium Superionic Conductor Materials for Use in Sodium Batteries," Journal of Power Sources, vol. 273, Jan. 1, 2015, pp. 1056-1064 (Abstract only).
(Continued)

*Primary Examiner* — Cynthia H Kelly
*Assistant Examiner* — Monique M Wills
(74) *Attorney, Agent, or Firm* — Daniel P. Morris, Esq.; Hoffmann & Baron, LLP (57) ABSTRACT

A solid-state conductor with sodium oxoferrate structure is disclosed. The conductor may be used in battery applications where it is preferable to avoid the use of a liquid electrolyte. The conductor may be produced from an initial $NaFeO_2$ chemical composition. So as to add defects and allow for sodium ion mobility, Fe(IV), Si, Sn, Ti, Zr, V, P, or S can be added. For example, $(1-x)(NaFeO2)+x(XO2)$ can be melted with the corresponding oxide $XO_2$, where X is Fe(IV), Si, Sn, Ti, Zr, V, P, or S, and x is between 0.1 and 0.5. These dopants generally preserve the crystallographic structure while decreasing the ion mobility barrier.

20 Claims, 4 Drawing Sheets

(51) Int. Cl.
*H01M 10/0562* (2010.01)
*H01M 4/131* (2010.01)
*H01M 4/133* (2010.01)
*H01M 4/134* (2010.01)
*H01M 4/136* (2010.01)

(52) U.S. Cl.
CPC ........... *H01M 4/134* (2013.01); *H01M 4/136* (2013.01); *H01M 10/0562* (2013.01); *H01M 2220/20* (2013.01); *H01M 2220/30* (2013.01); *H01M 2300/0068* (2013.01)

(56) References Cited

U.S. PATENT DOCUMENTS

| | | | |
|---|---|---|---|
| 2011/0052986 A1* | 3/2011 | Barker | H01M 4/5825 |
| | | | 429/220 |
| 2014/0287305 A1 | 9/2014 | Wachsman et al. | |
| 2015/0249262 A1 | 9/2015 | Wachsman et al. | |
| 2015/0288035 A1 | 10/2015 | Lee et al. | |
| 2017/0373345 A1* | 12/2017 | Yamazaki | H01M 4/621 |

OTHER PUBLICATIONS

A.G. Jolley, et al., "Optimizing and Improving the Sodium Ion Conductivity of Nasicon," The Electrochemical Society, 229th ECS Meeting Abstracts, May 2016, p. 1.

B.L. Ellis, et al., "Sodium and Sodium-Ion Energy Storage Batteries," Current Opinion in Solid State and Materials Science, vol. 16, Issue 4, Aug. 2012, pp. 168-177 (Abstract only).

* cited by examiner

SODIUM ION SOLID-STATE CONDUCTORS WITH SODIUM OXOFERRATE STRUCTURE

The present invention is a continuation of U.S. patent application Ser. No. 15/480,202, filed Apr. 5, 2017, having the same title and inventors as the present application, the disclosure of which is hereby incorporated by reference herein in its entirety for all purposes.

BACKGROUND

The present invention relates generally to the technical field of solid-state conductors, and, more specifically, relates to sodium ion solid-state conductors.

As energy storage requirements become more demanding, next generation devices will require a multitude of high performance battery products. Electrochemical energy storage is required for grid storage, wireless communications, portable computing, and will be essential for the realization of future fleets of electric and hybrid electric vehicles.

Application areas, such as clean and renewable power, depend on new battery technology for longer cycle life, higher energy densities, better recharge ability and increased reliability. In addition, there will always be an environmental concern during production and use regarding safety and recycling. Further, since electrolytes in a battery conduct ions, block electrons, and separate the electrodes to prevent shorting, the electrolytes are an important part of a battery, and the development of high performance electrolytes will be significant for efficient battery technology, enhancement and broad applications.

Some batteries currently available use a liquid electrolyte containing a flammable organic solvent. As such, they require installation of a safety device to inhibit the temperature rise at the time of short circuit or improvement in technical structure or materials to inhibit short circuit. In contrast, a battery having a solid material can avoid this flammable solvent problem, and thereby simplify the safety device and reduce production cost and productivity.

Solid-state conductors that possess high ionic conductivity are needed for a broad range of electronic and power applications. Applications now also may include chemical sensors, transistors, electromechanical actuators, and light-emitting electrochemical cells. For some applications, it is desirable to incorporate high ionic conductivity while maintaining certain mechanical properties. In looking at those possible materials that can be used for conductors in these electrochemical energy conversion and storage systems, various candidates have appeared. However, the state of the art considers materials that are of limited availability, are expensive, or whose chemical processing is not environmentally green.

For future applications, new solid-state materials with high ionic (lithium and sodium) conductivities are needed. Specifically, for sodium ion batteries there are only few materials available that are good candidates to replace the liquid electrolyte. Most recognize the major class of solid-state sodium ion conductors as NASICON. These materials are based on Na—Zr—Si—P—O-based composite oxide, with the possibility of doping NASICON structures with Fe. However, these materials have the drawback of being reactive with metallic sodium. Thus, there is need for a different class of materials.

SUMMARY

This disclosure is not limited to the particular systems, devices and methods described, as these may vary. The terminology used in the description is for the purpose of describing the particular versions or embodiments only, and is not intended to limit the scope.

In one or more embodiments, an apparatus comprises a solid-state ion conductor represented by the general formula $NaFe_{3/4}X_{1/4}$, where X is selected from the group consisting of Fe(IV), Si, Sn, Ti, Zr, V, P, and S. The solid-state ion conductor may comprise a thin film. The apparatus may further comprise a first electrode in contact with the ion conductor, and a second electrode in contact with the ion conductor to create an electrochemical cell. Optionally, the apparatus may further comprise a first electrical lead in contact with the first electrode and a second electrical lead in contact with the second electrode. A first current collector in contact with the first electrode and a second current collector in contact with the second electrode may be added. In an alternative embodiment, the apparatus may comprise a first electrical lead in contact with the first current collector and a second electrical lead in contact with the second current collector. The apparatus may comprise a load attached to the first electrical lead and the second electrical lead. In an optional embodiment, the solid-state ion conductor may comprise a thin film, the first electrode may comprise a thin film, and the second electrode may comprise a thin film.

In a preferred embodiment, the first electrode may comprise a layer of negative solid-state material adapted for electrochemically adsorbing and desorbing lithium ions during charge and discharge, and the second electrode may comprise a layer of positive solid-state material adapted for electrochemically desorbing and adsorbing lithium ions during charge and discharge. The layer of negative solid-state material may comprise a layer of lithium metal, and the layer of positive solid-state material may comprise a layer of $V_2O_5$.

In other embodiments, an apparatus comprises a solid metal sodium unit and a coating on at least one surface of the solid metal sodium unit wherein the coating comprises a material represented by the general formula $NaFe_{3/4}X_{1/4}$, wherein X is selected from the group consisting of Fe(IV), Si, Sn, Ti, Zr, V, P, and S. In a preferred embodiment, the apparatus may further comprise an electrical terminal attached to the solid metal sodium unit, and the electrical terminal may penetrate the coating, and the coating may surround the solid metal sodium unit. In an optional embodiment, a wire can be attached to the solid metal sodium unit, and the coating can surrounds the solid metal sodium unit and a portion of the wire. The coating may comprise a thin film.

In an alternative embodiment, a method for forming a solid-state conductor comprises melting $(1-x)(NaFeO2)+x(XO2)$ with $XO_2$, where X is selected from the group consisting of Fe(IV) (iron), Si (silicon), Sn (tin), Ti (titanium), Zr (zirconium), V (vanadium), P (phosphorus), and S (silicon), and x is between 0.1 and 0.5. In a preferred embodiment, x is 0.25.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Various embodiments of solid-state conductors with sodium oxoferrate structures, electronic devices incorporating the solid-sate conductors, and associated methods of manufacturing are described below. The present invention, in embodiments, is based on Na—Fe—O-based composite oxides, properly substituting part of Fe with Si, Sn, Ti, Zr, V, P, or S.

In embodiments, solid-state conductors with sodium oxoferrate structures are used to refer to a solid material that is capable of transporting ions and/or other charge carriers to effect ionic and/or other types of conductivity, collectively referred to herein as "electrical conductivity." A person skilled in the relevant art will also understand that the technology may have additional embodiments, and that the technology may be practiced without several of the details of the embodiments described below.

By using a cognitive approach, two new materials are described that are thermodynamically stable with low ion diffusion barrier and low electronic conductivity to be used for sodium battery application. The present invention, in embodiments, will help the creation of a completely solid-state alternative to liquid-filled and polymer-gel batteries. The technological advancement of the present invention may assist in enabling performance enhancements through the reduction of inert materials in the battery and improve safety through the elimination of flammable organic liquids.

The new materials for solid-state conductors are good ionic conductors, are thermodynamically stable, and have low electronic conductivity. These new materials involve modification of simple sodium oxoferrate, which is widely available, cheap, and easy to manufacture.

The initial material has chemical composition $NaFeO_2$. This material has been screened through a database of crystallographic structures for use as a solid-state ionic conductor. $NaFeO_2$ has 3D channels populated by sodium ions with no defects and very low conductivity. In order to create defects and allow for sodium ion mobility, a new class of materials: $NaFe\_\{3/4\}X\_\{1/4\}$ with X=Fe(IV), Si, Sn, Ti, Zr, V, P. or S has been developed. These materials are synthesized, in embodiments, by appropriately melting $3*(NaFeO_2)$ with the corresponding oxide (XO2). However, various melts can be made according to the formula $(1-x)(NaFeO2)+x(XO_2)$, where X=Fe(IV), Si, Sn, Ti, Zr, V, P, or S and x is between 0.1 and 0.5. Formulations where x=0.25 are preferred in certain embodiments. The choice of the different "doping" elements has been made in order to preserve the crystallographic structure and to decrease the ion mobility barrier.

Figure 1:
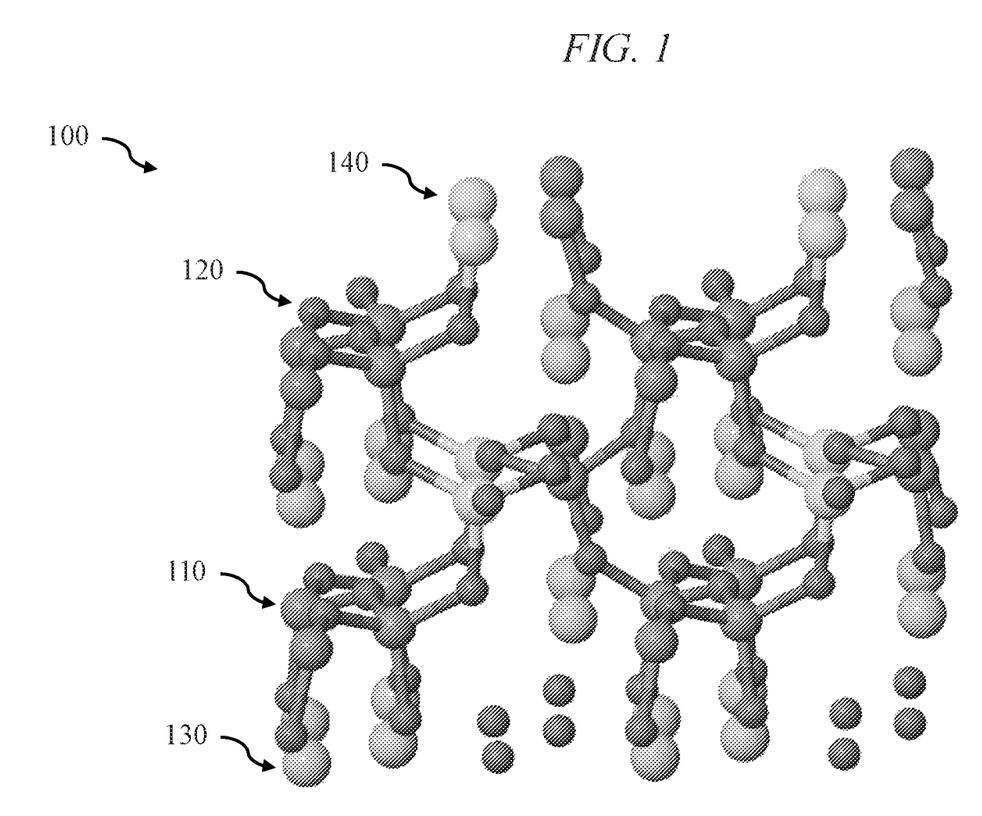
FIG. 1 illustrates a crystallographic structure of an embodiment of the present invention.

FIG. 1 illustrates a crystallographic structure 100 of an embodiment of the present invention. The figure shows the Fe 110, O 120, Na 130, and dopant 140 atoms arranged in the crystal structure 100. The dopant, in embodiments, can be Fe(IV), Sn, Si, Ti, Zr, V. P, or S.

Figure 2:
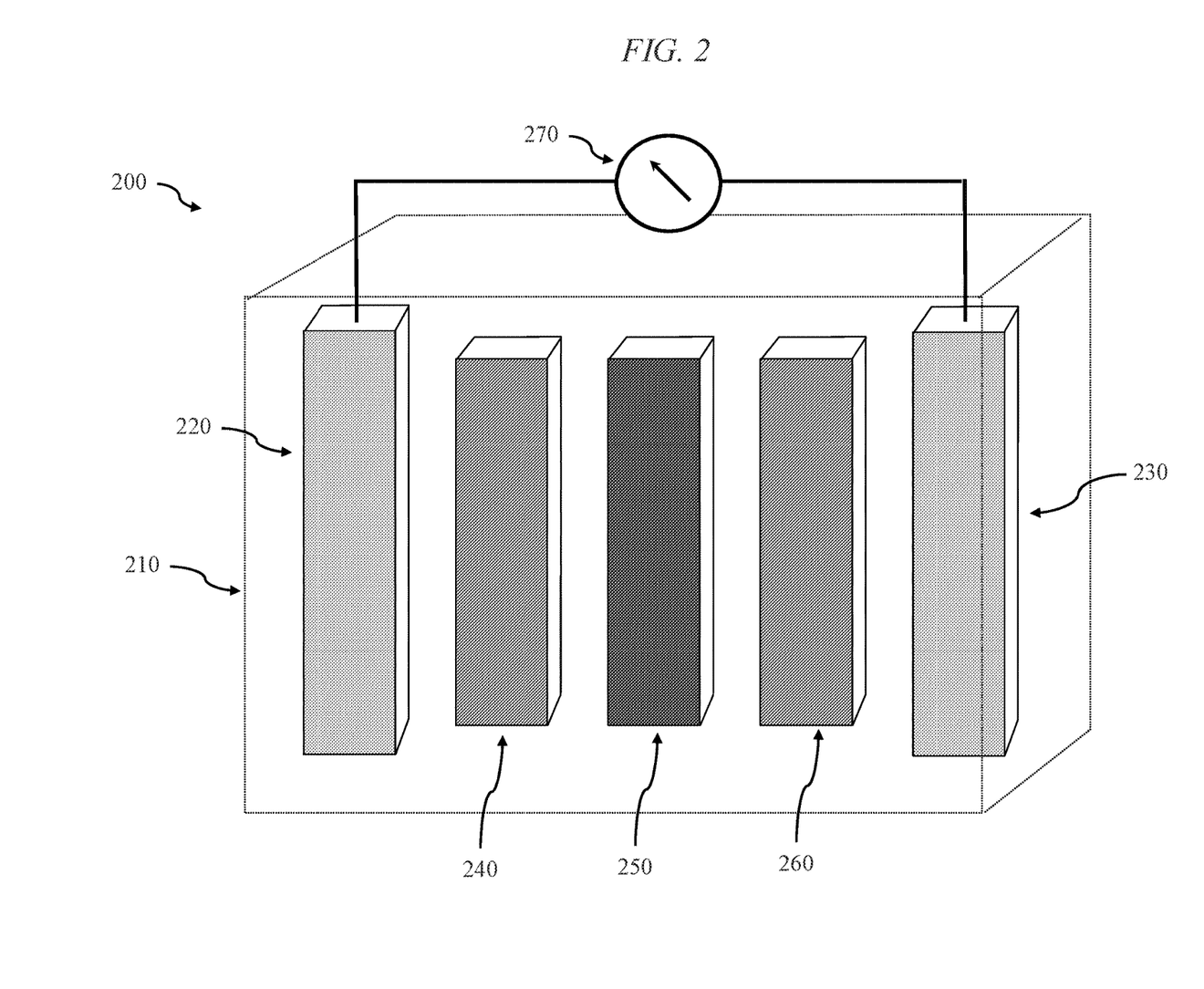
FIG. 2 illustrates a schematic representation of a fully solid-state sodium battery, according to an embodiment of the present invention.

FIG. 2 illustrates a schematic representation of a fully solid-state sodium battery 200, according to an embodiment of the present invention. The electrochemical cell packaging 210 contains a cathode current collector 220, an anode current collector 230, a cathode 240, an anode 260, and the solid-state electrolyte 250. The components 220, 240, 250, 260 and 230 are in contact with each other in order to create a battery. The anode collector 230 permits the electron to flow during discharge from anode 260 to cathode 240 via the external circuit 270 and cathode collector 220. The solid-state electrolyte 250 is positioned between the anode and cathode. The electrochemical cell generates a current, which can be used to power an external circuit 270, such as an electrical load.

As shown in FIG. 2, ions are extracted from the anode 260 and migrate toward the cathode 240 via the solid-state electrolyte 250. The ions pass through the solid-state electrolyte 250 and are inserted into the cathode 240. As a result, a current flows from the cathode 240 to the anode 260. During charging, a charger can provide a charging current to the cathode 240. The charging current will cause the ions to be extracted from the cathode 240 and move toward the anode 260.

In embodiments, the electrochemical cell package 210 and its contents can be constructed using thin-film techniques. A substrate of the package is first provided. To enable electrical power to be withdrawn from the battery, a current collector film can be deposited on the substrate, and then the cathode film is deposited upon the collector film. The electrolyte film is then deposited in place so as to cover the cathode film. An anode is deposited upon the previously formed films so as to directly overlie a substantial portion of the electrolyte. A protective covering as part of the package can then be placed over the top surface of the anode. Additional current collectors, wires, leads, or electrical terminals can be added to the package to connect to the external circuit or electrical load. These wires can penetrate the package to provide access.

In an embodiment, the anode 260 can include a carbonaceous material (e.g., graphite), tin (Sn), Zinc (Zn), lead (Pb), antimony (Sb), bismuth (Bi), silver (Ag), gold (Au), and/or other element electrodeposited on and alloy with lithium (Li), or combinations thereof. In another embodiment, the anode 260 can also include a binary, ternary, or higher order mixtures of the elements that can be electrode posited on and alloy with lithium (Li). Non-limiting examples of binary mixtures include Sn—Zn, Sn—Au, Sn—Sb, Sn—Pb, Zn—Ag, Sb—Ag, Au—Sb, Sb—Zn, Zn—Bi, Zn—Au, and combinations thereof. Non-limiting examples of ternary mixtures include Sn—Zn—Sb, Sn—Zn—Bi, Sn—Zn—Ag, Sn—Sb—Bi, Sb—Zn—Ag, Sb—Zn—Au, Sb—Sn—Bi, and combinations thereof. A non-limiting example of a quaternary mixture can include Sn—Zn—Sb—Bi. In yet another embodiment, the anode 260 can include intermetallic compounds of elements (e.g., the generally pure elements discussed above) and other elements that can be electrodeposited and alloy with lithium (Li). Non-limiting examples of such intermetallic compounds include Sn—Cu, Sn—Co, Sn—Fe, Sn—Ni, Sn—Mn, Sn—In, Sb—In, Sb—Co, Sb—Ni, Sb—Cu, Zn—Co, Zn—Cu, Zn—Ni, and combinations thereof. The anode is adapted for electrochemically adsorbing and desorbing lithium ions during charge and discharge.

The cathode 240 can be constructed from a layered oxide (e.g., lithium cobalt oxide (LiCoO2)), a polyanion (e.g., lithium iron phosphate (LiFePO4)), or a spinel (e.g., lithium manganese oxide (LiMnZO4)). Other suitable materials for forming the cathode 240 can include lithium nickel oxide (LiNiOZ), lithium iron phosphate fluoride. The cathode is adapted for electrochemically desorbing and adsorbing lithium ions during charge and discharge.

In alternative embodiments, the fully solid-state sodium battery 200 can also include insulators, gaskets, vent holes, and/or other suitable components (not explicitly shown, but implied).

Figure 3:
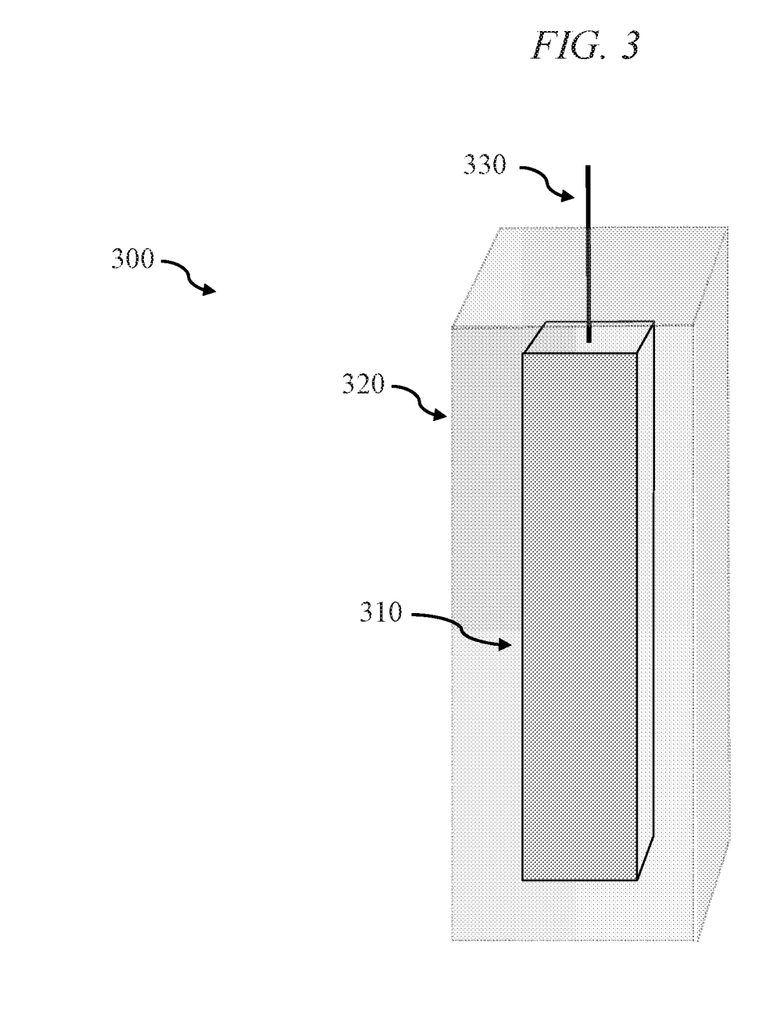
FIG. 3 illustrates a schematic representation of a metallic anode protected with a sodium-ion conducting material, according to an embodiment of the present invention.

FIG. 3 illustrates a schematic representation of a metallic anode 300 protected with a sodium-ion conducting material, according to an embodiment of the present invention. A metallic Na bar 310 is covered with a Na-ion conducting coating 320. The bar 310 may be solid metal sodium. A wire 330 or terminal composed of a conducting material can penetrate or otherwise pass through or penetrate the Na-ion conducting coating 320 to connect to the Na bar 310. The coating 320 can help protect the bar 310 from corrosion or other effects.

Figure 4:
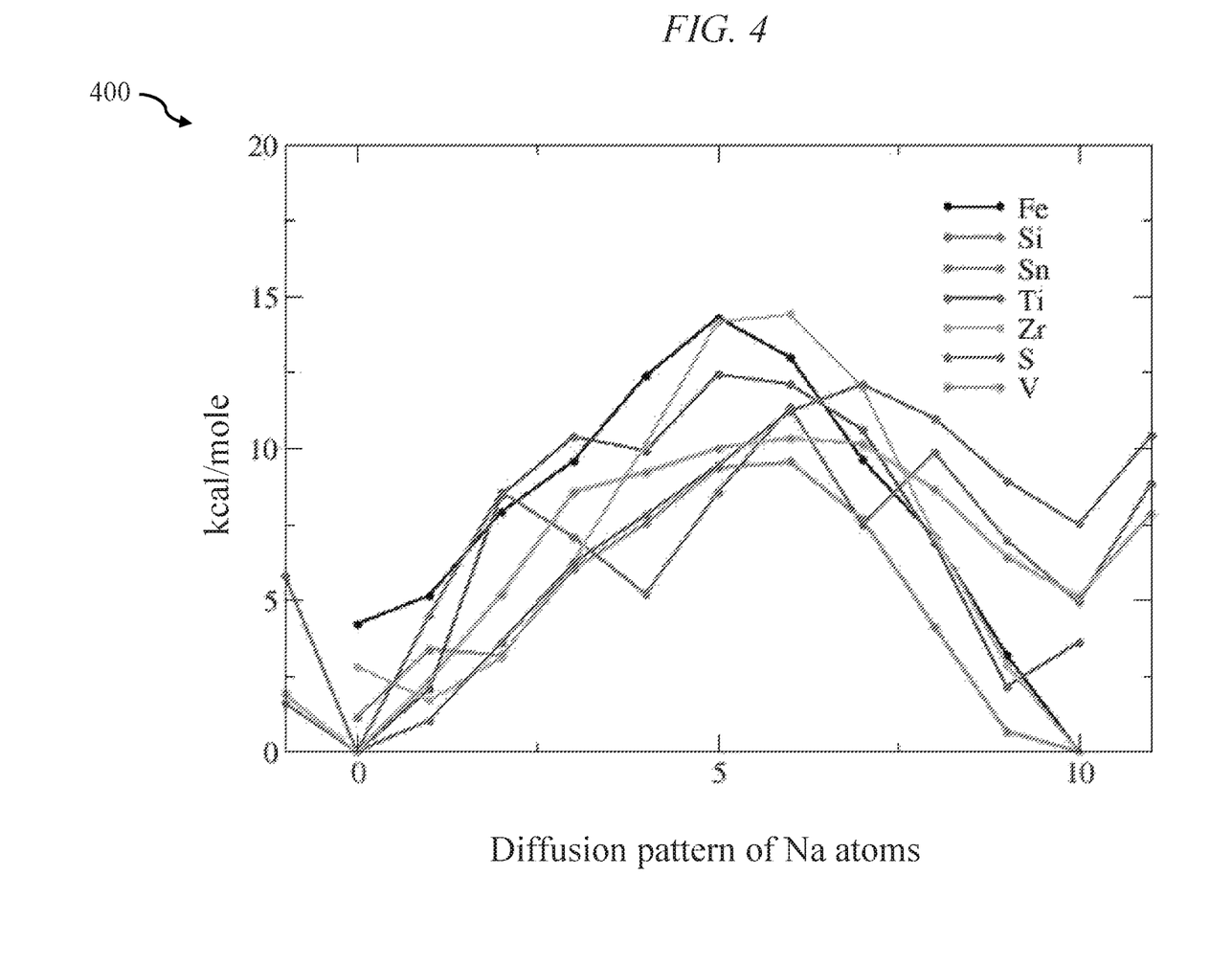
FIG. 4 shows an energy profile along the diffusion pattern of Na atoms the crystallographic materials, according to embodiments of the present invention.

FIG. 4 shows an exemplary energy profile 400 along the diffusion pattern of Na atoms in the crystallographic materials, according to embodiments of the present invention. The x-axis is the diffusion pattern of Na atoms, and the y-axis is the energy profile. The different curves represent the different elemental substitution according to the NaFe_{¾}X_{¼} with X=Fe(IV), Si, Sn, Ti, Zr, V, P, or S formulations. The barriers and with respect to the original structure were computer and barrier for mobility decreasing from 0.5 eV for the original material to approximately 0.25 eV for X=Si and X=Sn was reported. Both these materials also show a higher band-gap with reduced electron mobility.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds, composition or logical systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims bodies of the appended claims, are generally intended as "open" terms (e.g., the term "including" should be interpreted as "including but not limited to," the term "having" should be interpreted as "having at least," the term "includes" should be interpreted as "includes, but is not limited to" etc.). It will be further understood by those skilled in the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should he interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not he limited to systems that have A alone, B alone, C alone, A and B together, A and C together, B and C together, and/or A, B, and C together, etc.). In those instances where a convention analogous to "at least one of A, B, or C, etc." is used, in general such as construction is intended in the sense that one having skill in the art would understand the convention (e.g., "a system having at least one at A, B, or C" would include but not be limited to systems that have A alone B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of disclosure are described in terms of Markush groups, those skilled in the art will recognize that the disclosure is also thereby described in terms of any individual member or subgroup of members of the Markush group.

As will be understood by those skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An apparatus, comprising:
   a solid-state ion conductor represented by the general formula $NaFe_{3/4}X_{1/4}$, wherein X is selected from the group consisting of Fe(IV), Si, Sn, Ti, Zr, V, P, and S.

2. The apparatus of claim 1, wherein the solid-state ion conductor comprises a thin film.

3. The apparatus of claim 1, further comprising:
   a first electrode in contact with the ion conductor; and
   a second electrode in contact with the ion conductor.

4. The apparatus of claim 3, further comprising a first electrical lead in contact with the first electrode and a second electrical lead in contact with the second electrode.

5. The apparatus of claim 3, further comprising a first current collector in contact with the first electrode and a second current collector in contact with the second electrode.

6. The apparatus of claim 5, further comprising
a first electrical lead in contact with the first current collector; and
a second electrical lead in contact with the second current collector.

7. The apparatus of claim 6, further comprising a load attached to the first electrical lead and the second electrical lead.

8. The apparatus of claim 3, wherein the solid-state ion conductor comprises a thin film, the first electrode comprises a thin film, and the second electrode comprises a thin film.

9. The apparatus of claim 3, wherein the first electrode comprises a layer of negative solid-state material adapted for electrochemically adsorbing and desorbing lithium ions during charge and discharge.

10. The apparatus of claim 3, wherein the second electrode comprises a layer of positive solid-state material adapted for electrochemically desorbing and adsorbing lithium ions during charge and discharge.

11. The apparatus of claim 10, wherein the layer of negative solid-state material comprises a layer of lithium metal.

12. The apparatus of claim 10, wherein the layer of positive solid-state material comprises a layer of $V_2O_5$.

13. An apparatus, comprising:
a solid metal sodium unit; and
a coating on at least one surface of the solid metal sodium unit, wherein the coating comprises a material represented by the general formula $NaFe_{3/4}X_{1/4}$, wherein X is selected from the group consisting of Fe(IV), Si, Sn, Ti, Zr, V, P, and S.

14. The apparatus of claim 13, further comprising an electrical terminal attached to the solid metal sodium unit.

15. The apparatus of claim 14, wherein the electrical terminal penetrates the coating.

16. The apparatus of claim 13, wherein the coating surrounds the solid metal sodium unit.

17. The apparatus of claim 13, further comprising a wire attached to the solid metal sodium unit, and wherein the coating surrounds the solid metal sodium unit and a portion of the wire.

18. The apparatus of claim 13, wherein the coating comprises a thin film.

19. A method for forming a solid-state conductor, the method comprising melting (1−x)(NaFeO2)+x(XO2) with XO2, wherein X is selected from the group consisting of Fe(IV), Si, Sn, Ti, Zr, V, P, and S, and x is between 0.1 and 0.5, to thereby form the solid-state conductor having a sodium oxoferrate structure of the general formula $NaFe_{3/4}X_{1/4}$.

20. The method of claim 19, wherein x=0.25.

* * * * *